United States Patent [19]
Ells

[11] 3,935,739
[45] Feb. 3, 1976

[54] LIQUID LEVEL GAUGING APPARATUS
[75] Inventor: Edward G. Ells, Norwich, N.Y.
[73] Assignee: Liquidometer Corporation, Norwich, N.Y.
[22] Filed: Apr. 10, 1974
[21] Appl. No.: 459,591

[52] U.S. Cl............................. 73/304 C; 324/61 R
[51] Int. Cl.² ........................................ G01F 23/26
[58] Field of Search ............ 324/61 R, 61 P; 73/304

[56] References Cited
UNITED STATES PATENTS

| | | | |
|---|---|---|---|
| 2,868,015 | 1/1959 | Haropulos | 73/304 C |
| 3,283,577 | 11/1966 | Schuck | 73/304 C |
| 3,285,068 | 11/1966 | Morris | 73/304 C |
| 3,343,415 | 9/1967 | Johnston | 73/304 C |
| 3,665,209 | 5/1972 | Webb et al. | 73/304 C |
| 3,777,177 | 12/1973 | Norkum et al. | 73/304 R |
| 3,781,672 | 12/1973 | Maltby et al. | 73/304 C |
| 3,797,311 | 3/1974 | Blanchard et al. | 73/304 C |
| 3,801,902 | 4/1974 | Horowitz | 73/304 C |
| 3,812,424 | 5/1974 | Abbe | 324/61 R |

FOREIGN PATENTS OR APPLICATIONS

| | | | |
|---|---|---|---|
| 325,035 | 7/1972 | U.S.S.R. | 324/61 R |

*Primary Examiner*—Richard E. Aegerter
*Assistant Examiner*—John W. Shepperd
*Attorney, Agent, or Firm*—H. Gibner Lehmann; K. Gibner Lehmann

[57] ABSTRACT

A liquid level gauge for monitoring the height of liquid in a storage tank or the like. The gauge comprises an upright conducting probe adapted to be immersed in the liquid in the tank, and an upright series of electrodes closely adjacent the probe. The latter is adapted to be excited from a source of a.c. voltage generated by an astable multivibrator. Each of the electrodes is connected to the input of an amplifier through a rectifier circuit. The amplifiers are of the digital comparator type and have output terminals respectively connected by means of summing resistors to an electrical indicator such as a milliammeter, which provides an indication of the number of amplifiers being driven to full output at any particular time. The arrangement is such that each of the electrodes constitutes one plate of a capacitor, the other plate being formed by the single upright conducting probe. When a particular electrode is above the level of fluid in the tank, the magnitude of the a.c. signal received at the electrode is of a sufficiently small magnitude to provide only a low level drive voltage to its respective comparator amplifier, the latter thus assuming a low output signal level. Once a particular plate becomes submerged, the increased dielectric constant (fluid) effects an increase in the value of the capacitor, and a correspondingly larger drive signal to the amplifier results, causing the output thereof to assume a high level and yielding a contribution to the meter reading through the respective summing resistor. The meter reading thus responds to the number of electrodes submerged at any particular time, and provides an indication of the liquid level in the tank.

6 Claims, 2 Drawing Figures

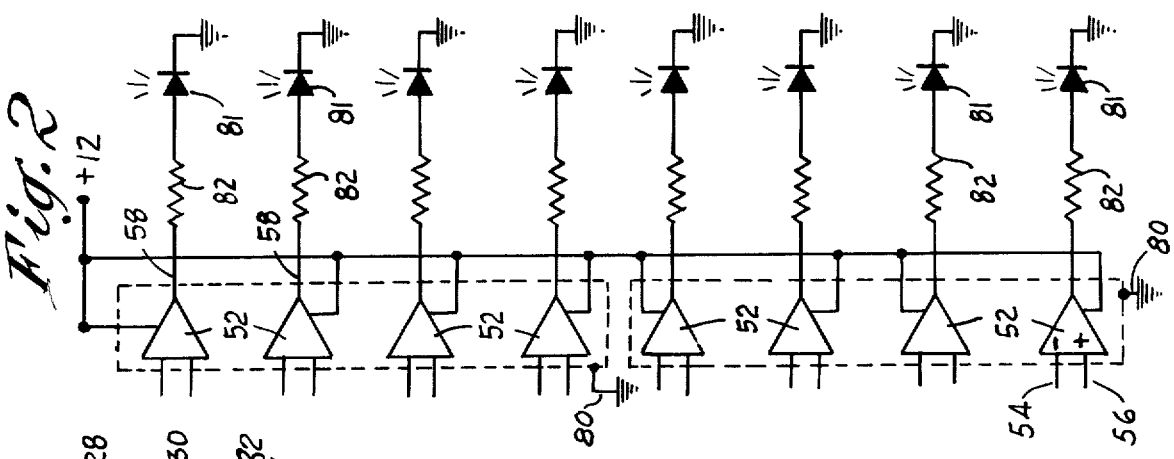
Fig.2
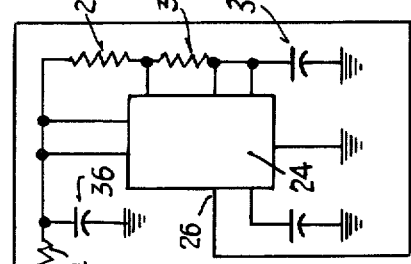
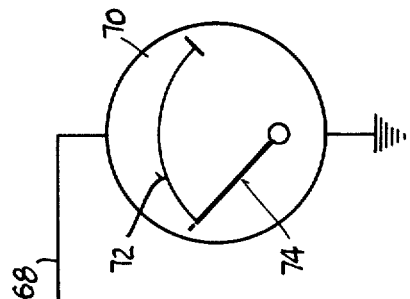
Fig.1
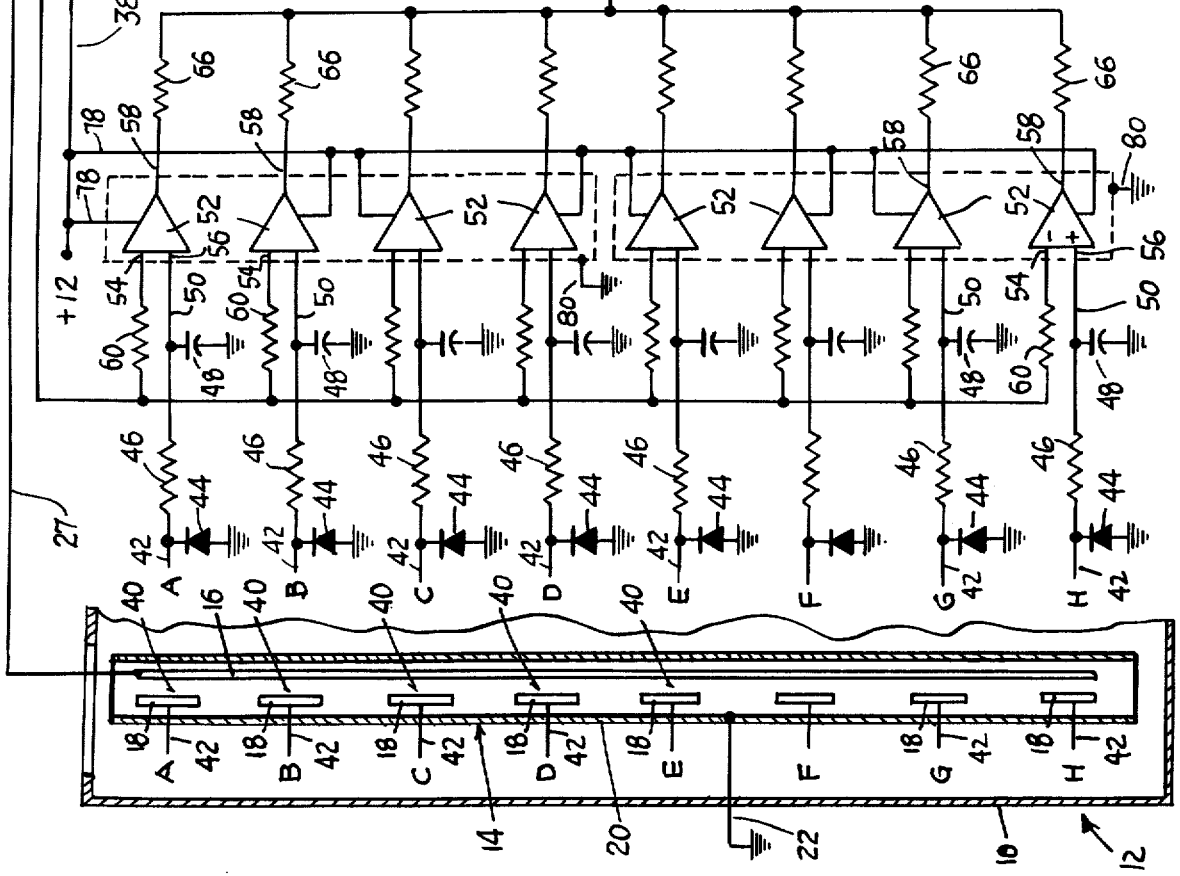

LIQUID LEVEL GAUGING APPARATUS

CROSS-REFERENCE TO RELATED COPENDING APPLICATIONS

Copending U.S. application entitled "Liquid Level Gauging Apparatus" in the name of Harrison F. Edwards, having the same ownership as the present application, U.S. Ser. No. 459,574, filed Apr. 10, 1974, now U.S. Pat. No. 3,911,744.

BACKGROUND

This invention relates generally to gauging systems for measuring or sensing the level of liquid contained in a fuel tank, storage tank or the like.

In the past, a number of level indicators have been proposed and constructed. U.S. Pat. No. 2,398,375 illustrates one such system, showing a storage tank and an indicator device having conduits respectively connected to the top and bottom of the tank. The lower conduit is adapted to transfer the pressure existing at the bottom of the tank to a first diaphragm of the gauge. The upper conduit transmits the pressure at the top of the tank to a second diaphragm. Disposed between the diaphragms is a vertical chamber having a resistance wire running for substantially its full length, the chamber being filled with a column of mercury. Depending upon the relative pressure sensed by the two conduits, the level of mercury in the chamber changes, short circuiting either a greater or lesser length of the resistance wire. Indicator means connected to sense the resistance of this wire provides visual readings. By this arrangement, an indication of differential pressures between the top and bottom of the tank is obtainable, such an indication being independent of the absolute pressure existing outside of the tank. In addition, a plurality of contacts is disposed along the length of the chamber, such contacts being successively submerged as the height of the column of mercury increases. The contacts are connected to signal lights which in turn are energized by a battery having one lead in contact with the mercury column. The arrangement is such that as the level of mercury rises, it bridges additional contacts, thus causing the indicator lights to become successively illuminated. Each light corresponds to a particular pressure differential which can be converted into a corresponding level reading.

While this system was considered satisfactory at that time, several disadvantages became apparent later. Limitations on the permissible deflection of the diaphragms impaired the accuracy of the device. In addition, the weight of the column of mercury acted against the weight of the liquid being gauged, and accordingly, liquids of different specific gravity resulted in erroneous readings. As a result, the unit had to be recalibrated each time a different liquid was incorporated in the tank. Also, the deflection of the diaphragms tended to be insensitive, and thus small changes in the level of fluid were not noticeable or measurable on the indicator.

Other systems employed a plurality of electrodes which were submerged in the fluid being gauged, together with bridge circuits of one sort or another adapted to measure the electronic conductivity or impedance of the fluid or capacitance between the electrodes, such readings being a direct function of the level of liquid in the tank. These systems were frequently dependent on the particular conductivity and/or dielectric constant of the fluid and thus required calibration each time it was changed. In addition, these systems lacked accuracy and were generally not useable with different liquids having wide ranges of conductive/dielectric characteristics.

SUMMARY

The above drawbacks and disadvantages of prior liquid level gauging devices are obviated by the present invention which has for its main object the provision of an improved liquid level gauge which is especially simple in its construction while at the same time being especially accurate in providing liquid level readings. A related object is the provision of a gauging apparatus as above, which provides accurate readings substantially independent of the conductivity, dielectric constant or other characteristics of the liquid being gauged. A related object of the invention is the provision of an improved gauge which is constituted of a minimum number of components whereby there is realized an especially low cost, and which is characterized by a reliable and service-free operation over an extended period of usage or time. A further object of the invention is to provide a gauging apparatus which yields either an analog or a digital reading of the level of fluid in the tank, either reading being obtained with a high degree of accuracy and repeatability.

The above objects are accomplished by a liquid level gauge including an upright conducting probe device which is adapted to be immersed in the liquid to be gauged for contact therewith at a multiplicity of levels, a cooperable probe device comprising an upright row of electrodes insulated from each other and adapted for immersion in the liquid adjacent the location of the conducting probe, a source of voltage applied to the upright probe device, and amplifying or detecting means permanently connected with the upright electrodes for receiving electrical signals therefrom and for indicating the magnitude of such signals. An indicator device constitutes a part of the detector means for providing absolute readings of the level of liquid in the tank.

In operation, each of the electrodes forms, with the upright conducting probe, a small capacitor. When a particular electrode is above the level of fluid in the tank, the capacitance associated therewith has a predetermined value dependent upon the surface area of the plates, the spacing of the plates, and the dielectric constant of air. When such an electrode becomes submerged, the increased dielectric constant of the fluid alters (increases) the capacitance, and thus provides a higher amplitude drive signal to the detector or amplifying means, the latter in turn providing a drive signal to the indicator device. A plurality of upright electrodes is provided, each having its own amplifier, and the outputs of each amplifier are connected through summing resistors to the indicator device. Alternately, the outputs can be connected respectively to light-emitting diodes which are successively illuminated as the level rises, to provide digital readings.

All portions of the system with the exception of the two probe devices can be located exteriorly of the tank, and such location may be at a point remote from the tank, as desired.

The construction of the electrodes and of the conducting probe is both simple and foolproof; the a.c. generator and detector circuits are likewise simple and responsive, while at the same time being extremely responsive, accurate, whereby there is realized a flexible system of high accuracy, reliability and adaptability to various installations, as well as being low cost.

Still other features and advantages will hereinafter appear.

In the drawings, illustrating several embodiments of the invention:

FIG. 1 is a schematic circuit diagram and diagrammatic representation of the present gauging system, being adapted to provide a reading of the level of liquid in a tank, on an analog-type indicator device.

FIG. 2 is a schematic circuit diagram and diagrammatic representation of another embodiment of the invention, adapted to provide a direct digital reading of the liquid level in a tank.

Referring first to FIG. 1, there is illustrated a storage tank or container 10 for holding a large quantity of fuel oil, gasoline, or other liquid product. In accordance with the present invention, there is provided a gauging apparatus for monitoring the level of fluid in the tank, the apparatus being generally designated by the numeral 12, and comprising an immersion unit 14 disposed in an upright position in the tank. The unit 14 comprises an upright conducting probe device 16 immersed in the body of liquid and adapted for contact at a multiplicity of levels therewith, and a second probe device comprising an upright row of conducting electrodes 18, insulated from one another and adapted for immersion in the liquid body in proximity to the first probe device. Each of the electrodes 18 has a finite vertical dimension, and they are disposed vertically one above the other as illustrated. Completely encircling the probe 16 and electrodes 18 is a substantially cylindrical guard member in the form of a conducting cylinder 20. The guard member is maintained at ground potential by means of a lead 22 connected therewith.

There is further provided means for applying voltage to the upright conducting probe 16, comprising an integrated-circuit type astable multivibrator 24 having an output terminal 26 which extends to a lead 27 connected with the probe 16. The multivibrator generates a square-wave output on terminal 26 at a frequency determined by the values of resistors 28, 30 and capacitor 32. I have found that a frequency range of from 10 kHz to 100 kHz is satisfactory, and that it is desirable to have the capability of varying this frequency depending upon the geometry and spacing of the particular conducting probe and electrodes employed. Resistor 34 and capacitor 36 provide filtering between the multivibrator 24 and the positive supply bus 38 to prevent square-wave energy from being transferred onto the latter as ripple.

In accordance with the present invention, each of the electrodes 18 forms (with the conducting probe 16) a capacitor 40. A plurality of leads 42 extends from each of the electrodes 18 to a plurality of electrical networks comprising diodes 44, resistors 46 and capacitors 48, respectively. These connections are indicated by the letter designations A-H on the leads 42 at the locations of the electrodes, and by the corresponding designations A-H at the locations of the networks. These correspondingly lettered leads are considered as being connected to one another. Each network converts an a.c. signal which appears at its input, line 42, to a d.c. level on its output, line 50. As shown, all of the networks connected with the individual electrodes 18 are substantially identical to one another.

The present invention also embraces a plurality of amplifier devices 52, each having inverting and non-inverting inputs 54, 56 respectively and an output terminal 58. As shown, the non-inverting input terminal 56 is connected to receive energy through the electrical network from the corresponding electrode 18. The inverting input 54 is connected via resistor 60 to a source of constant voltage derived from the positive bus 38, and determined by the magnitude of the divider resistors 62, 64. The bus 38 leads to a d.c. supply (not shown) of +12 volts. The amplifiers 52 are preferably of the comparator type, which provide either a high or low digital output level depending on whether the voltage applied to one input 56 is greater than or less than the voltage appearing on the other input 54. These amplifiers may be of the integrated-circuit variety wherein multiple units are incorporated in a single package. We have found that amplifiers having the commercial designation LM 3900 are satisfactory for this application. The integrated circuits, each consisting of four amplifiers 52, are indicated by the dotted outlines, respectively in FIGS. 1 and 2.

Connected to the output terminals 58 of the amplifiers are summing resistors 66 respectively, one terminal of each of the latter being connected to a common lead 68. Indicator means are provided comprising a milliammeter 70, having a graduated scale 72 and pointer 74, one lead wire of the meter being connected to ground as shown. The amplifiers 52 are supplied from the positive bus 38 by means of leads 78, and leads 80 connect the other (−) supply terminals of all of the amplifiers 52 to ground. Discrete connections of each amplifier 52 for this negative lead are omitted from FIG. 1 in the interest of clarity.

The operation of the improved liquid gauging apparatus of the present invention may now be readily understood. The astable multivibrator 24 continuously applies a square wave to the upright conducting probe 16. Referring for the moment to the lowermost electrode 18 and its associated amplifier 52, it is seen that the latter has a fixed reference voltage applied to the inverting input terminal 54. When the tank is empty, the value of the capacitor 40 formed by the lowermost plate 18 and probe 16 will have a predetermined value. The capacitor 48 and resistor 46 are selected such that the d.c. voltage appearing on input terminal 56 is less than the voltage applied to terminal 54, for a nonsubmerged condition of the lowermost electrode 18. This in turn yields a low (digital) level output signal on terminal 58 of the lowermost amplifier 52 in FIG. 1. Assuming the liquid level in the tank became sufficient to partially or fully submerge the lowermost plate or electrode 18, the value of the capacitor 40 increases, due to the higher dielectric constant of the particular fluid being gauged with respect to the dielectric constant of air. Such an increase produces a larger a.c. voltage on line 42 which, following rectification by diode 44, and filtering by resistor 46 and capacitor 48 results in an increased d.c. level at the noninverting input terminal 56 of the amplifier 52. The fluid is thus characterized by the property of establishing a cooperable relationship between the probe device 16 and certain of the electrodes 18 as the level of liquid in the tank rises or falls. The relationship established is that of the dielectric constant of the medium between the plates of each capacitor 40. The values of the components are chosen such that this increase in d.c. level is sufficient to exceed the d.c. voltage on terminal 54 and thus drive the output 58 of amplifier 52 to a high digital level. Such a condition is indicated on the milliammeter 70 by a deflection of roughly one-eighth of full-scale when the outputs of the other seven amplifiers 52 are all low.

Assuming the next higher electrode 18 becomes partially or fully submerged, the output of the corresponding amplifier 52 will switch from a low digital level to a high digital level, such increase being reflected on line 68 as a slightly higher d.c. voltage, causing the milliammeter 70 to read a larger percentage of fullscale. Similarly, with the three lowermost electrodes submerged, an additional contribution will be made by the corresponding amplifier, yielding a still larger percentage of full scale deflection on the meter. It is thus seen that with all of the electrodes submerged, the outputs of all eight amplifiers 52 will assume high digital levels respectively, resulting in a full scale deflection of the milliammeter 70. Thus, the meter reading yields an indication of the absolute level of liquid in the tank at any particular time. In this connection, it should be noted that the resistors 66 will all be substantially identical and are chosen to provide a one-eighth of full-scale deflection of the milliammeter 70 when one amplifier 52 has a high digital output level, with all remaining amplifiers having a low digital output level respectively. It is seen that the detector comprising amplifiers 52 and meter 70 respond to the changes in the dielectric constant of the capacitors 40 in accordance with the changes in level of the liquid in the tank.

By way of further explanation, when the output of multivibrator 24 is low, the capacitor 40 charges through diode 44. When the multivibrator output is high during the next half cycle, diode 44 is reverse-biased, and the capacitor 40 transfers some of its charge to the filter capacitor 48, thus charging the latter by a limited extent. Under these circumstances, current will flow into the positive input terminal 56 of the amplifier 52, equal to the charge (in coulombs) which was transferred to the capacitor 40 through diode 44 during the previous one-half cycle, times the reciprocal of the multivibrator frequency. It will be understood that the nature of the signal appearing on line 50 will be that of d.c. level with superimposed ripple. Depending on the amplitude of this d.c. level, the amplifier 52 will assume either a low digital output or a high digital output, and will contribute to the meter reading accordingly.

It will be seen that the scale 72 can be calibrated in any convenient units, such as feet, meters, etc. In addition, any degree of accuracy can be achieved by simply increasing the number of electrodes 18, as well as the number of networks and of amplifiers 52, and reducing the vertical dimensions and spacing of such electrodes. The only compromise in achieving this increased accuracy (or resolution) is one of higher cost, due to the additional electrodes 18, network components 44, 46, 48 and amplifiers 52.

Another embodiment of the invention is illustrated in FIG. 2, wherein like reference numerals indicate components similar to those of the first embodiment. By the present invention, there are provided means for obtaining a digital indication of the liquid level in the tank, such means comprising a plurality of optical indicator devices such as light-emitting diodes 81. As in the previous embodiment, a plurality of amplifiers 52 are shown having input circuitry connected as in the first mentioned embodiment. The output terminals 58 thereof extend to the diodes 81 through current limiting resistors 82, respectively. One lead of each diode 81 is grounded as shown.

In operation, it will be seen that when the digital output level of any particular amplifier is low, a current which is insufficient to illuminate the diode 81 will result. As a particular electrode becomes partially or fully submerged, such that the amplifier 52 is driven to a high digital output level, a substantially larger current will flow through the resistor 82 and the diode 81, resulting in illumination of the latter. It will be understood that the value of the resistor 82 is chosen to provide the recommended excitation current for the particular diode 81 employed, when the amplifier (52) output is high. It is thus seen that as the level of fluid in the tank increases, a successively greater number of diodes 81 will become illuminated. Such diodes could be carried on a suitable indicator panel (not shown) having a calibrating indicia corresponding to the level of fluid in the tank. By this construction, a digital indication of the fluid level in the tank is thus obtainable.

From the above it can be seen that I have provided a novel and improved liquid gauging system which is extremely simple in construction, employing an absolute minimum number of separate components, and which can provide course readings at a very low cost, with progressively finer resolution readings at a moderately increased cost. The single moving part of the apparatus is the milliammeter. By the use of integrated circuits, the overall current drain is kept to an absolute minimum, with very low power consumption. The device can be excited from any suitable constant voltage source such as a battery, the latter being preferable to regulated supplies running off commercial mains, due to the better isolation obtainable against objectionable 60 cycle signals. The device is thus seen to represent a distinct advance and improvement in the technology of liquid level gauging systems.

Variations and modifications are possible without departing from the spirit of the invention.

I claim:

1. In a liquid storage installation, a liquid-level indicator means comprising, in combination:
   a. a storage tank having a large body of liquid stored therein,
   b. an upright, electrically conducting probe device immersed in said body of liquid and adapted for contact at a multiplicity of levels therewith,
   c. a second probe device cooperable with said first-mentioned probe device, said second prove device comprising an upright row of electrodes insulated from each other and adapted for immersion in said body of liquid in proximity to said first-mentioned probe device so as to form a plurality of capacitors therewith,
   d. an electrical guard comprising a conducting cylinder encircling said probe devices,
   e. means connected with said guard for maintaining it at a predetermined level of potential,
   f. means for generating an a.c. signal having a substantially constant frequency and for applying it to the first probe device, portions of said signal being capacitively coupled to said electrodes,
   g. a plurality of rectifier and filter circuits having output terminals, and having input terminals connected with said electrodes, respectively, so as to receive energy therefrom, h. a plurality of comparators having first input terminals connected respectively with the output terminals of said rectifier and filter circuits, having second input terminals connected to means having a constant D.C. potential, and having output terminals, i. a plurality of summing resistors connected respectively to the output terminals of said comparators, and j. a meter, k. said summing resistors having a common lead connected to said meter such that contributions of each comparator are algebraically summed by the meter.

2. The invention as defined in claim 1, wherein:

a. said filter circuits comprise RC circuits, respectively.

3. The invention as defined in claim 1, wherein:

a. said electrodes are disposed one above the other in a vertical column, b. the number of said electrodes submerged in the fluid at any time being directly related to the level of fluid in the tank.

4. In a liquid storage installation, a liquid-level indicator means comprising, in combination:

a. a storage tank having a large body of liquid stored therein, b. an upright, electrically conducting probe device immersed in said body of liquid and adapted for contact at a multiplicity of levels therewith, c. a second probe device cooperable with said first-mentioned probe device, said second probe device comprising an upright row of electrodes insulated from each other and adapted for immersion in said body of liquid in proximity to said first-mentioned probe device so as to form a plurality of capacitors therewith, d. an electrical guard comprising a conducting cylinder encircling said probe devices, e. means connected with said guard for maintaining it at a predetermined level of potential, f. means for generating an a.c. signal having a substantially constant frequency and for applying it to the first probe device, portions of said signal being capacitively coupled to said electrodes, g. a plurality of rectifier and filter circuiits having output terminals, and having input terminals connected with said electrodes, respectively, so as to receive energy therefrom, h. a plurality of comparators having first input terminals connected respectively with the output terminals of said rectifier and filter circuits, having second input terminals connected to means having a constant D.C. potential, and having output terminals, i. a plurality of light-emitting diodes connected respectively to the output terminals of said comparators, to indicate the output condition thereof.

5. The invention as defined in claim 4 wherein a. said filter circuits comprise RC circuits, respectively.

6. The invention as defined in claim 4 wherein:

a. said electrodes are disposed one above the other in a vertical column, b. the number of said electrodes submerged in the fluid at any time being directly related to the level of fluid in the tank.

* * * * *